3,533,675

Filed Jan. 26, 1968

Robert E. Brooks,
INVENTOR.

BY

ATTORNEY.

Oct. 13, 1970  R. E. BROOKS  3,533,675
SMALL-ANGLE INTERFEROMETER FOR MAKING HOLOGRAMS
Filed Jan. 26, 1968  2 Sheets-Sheet 2
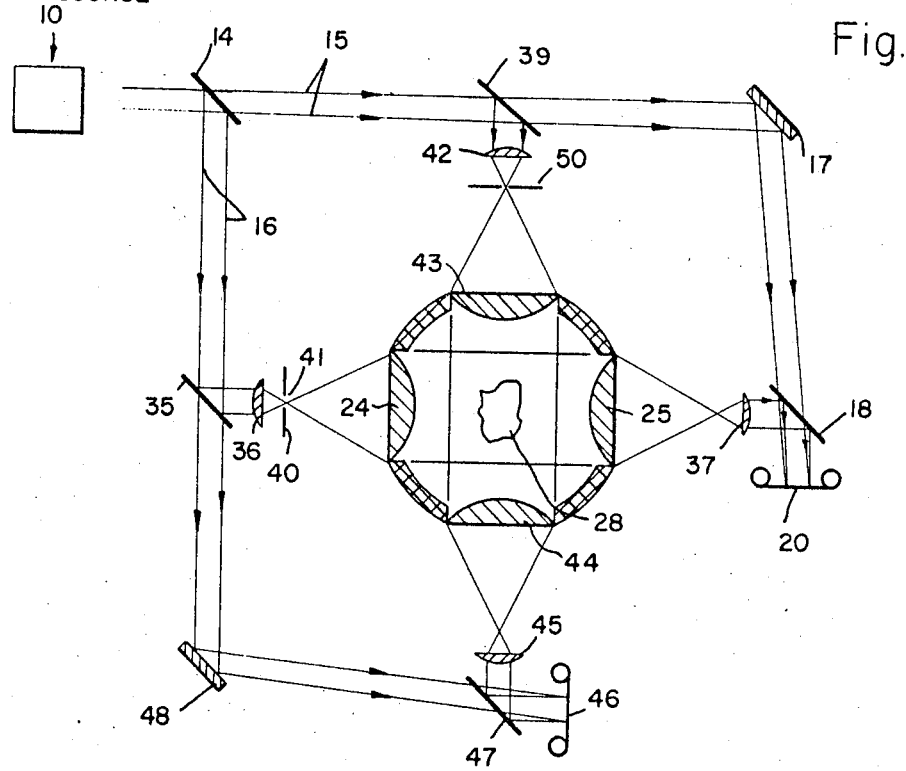
Fig. 2.
Fig. 4.
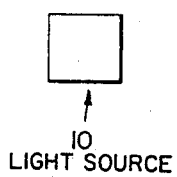
Robert E. Brooks,
INVENTOR.
BY.
ATTORNEY.

3,533,675
SMALL-ANGLE INTERFEROMETER FOR MAKING HOLOGRAMS

Robert E. Brooks, Redondo Beach, Calif., assignor to TRW Inc., Redondo Beach, Calif., a corporation of Ohio
Filed Jan. 26, 1968, Ser. No. 701,000
Int. Cl. G02b 27/00, 9/02
U.S. Cl. 350—3.5                  4 Claims

ABSTRACT OF THE DISCLOSURE

Various interferometric arrangements are disclosed which are suitable for making holograms, particularly for double exposure and real-time interferometry. The interferometers are so arranged that the reference and subject beams are recombined at a small angle. This in turn permits the use of a low-resolution light-sensitive medium. Such low-resolution photographic plates usually have high speed. In addition, the subject beam is enlarged before passing through the subject and subsequently reduced in size again. Accordingly holograms of subjects much larger than the beam may be obtained.

BACKGROUND OF THE INVENTION

This invention relates generally to light interferometers, and particularly relates to the art of holography.

Holography is sometimes known as wavefront reconstruction. A hologram is obtained by recording the optical interference pattern produced on a light-sensitive medium such as a photographic emulsion. The interference pattern is caused by the interference of a reference beam and a subject beam. The light source must develop coherent monochromatic light, and accordingly the light source is usually a laser, which is an acronym for "light amplification by the stimulated emission of radiation." A hologram may be reconstructed by illuminating it with a beam of monochromatic light. This will reconstruct the recorded set of wavefronts. The hologram may be considered an optical grating, and the first orders of diffraction yield an image and a conjugate image, one of which is a real image of the original subject while the other is a virtual image.

It has also become known to make a hologram which has been twice exposed. Thus a conventional hologram is first made. Subsequently the same subject, at a later time or at a different condition, is again recorded on the same plate to produce a second hologram. Accordingly two sets of wavefronts are recorded. When this double-exposed hologram is illuminated with monochromatic light, the reconstructed beam is indicative of the phase differences between the two recorded sets of wavefronts. Accordingly what is seen may be considered a third interference pattern corresponding to the difference in phase of the waves of the two sets of wavefronts which have originally been recorded.

Such a double-exposure holographic interferometer may be used, for example, for first recording, say, a cold experimental setup, and thereafter the combustion front of a hot gas ignited in any suitable manner in the setup. In a similar manner a subject may be compared with its recording to permit real-time holographic interferometry.

The low-angle interferometry of the present invention is particularly adapted to obtain double-exposure holographic plates. To this end, use is made of interferometric arrangements which permit recording of the subject beam and the reference beam at a small angle. This will produce a relatively coarse interference pattern. For that reason it is possible to utilize low-resolution photographic media. Generally such low-resolution plates or films have high sensitivity. An example of such a film is the Tri-X Pan which has a light sensitivity of ASA 400. This of course facilitates the recording of holograms of phenomena during extremely short periods of time.

On the other hand, the small angle between the two beams before they are recorded has certain disadvantages, such as reduced image resolution and a reduced viewing angle. However, for many applications these limitations are more than balanced by the high-speed exposures which may be recorded.

In addition, it has been proposed to enlarge the subject beam before it illuminates the subject and subsequently to reduce it again in size. This makes possible the use of small-area holograms, and hence it is possible to take holographic movies, say, on 16 mm. (millimeter) film, of larger subjects. The combination of these new features yields new and unexpected results.

It is accordingly an object of the present invention to provide an interferometer permitting to recombine a subject and a reference beam at a very small angle, thereby to permit the use of low-resolution photographic emulsions.

Another object of the invention is to provide a small-angle interferometer of the type discussed, which additionally has means for enlarging the subject beam before it illuminates the subject, and for subsequently reducing the beam again in size before recombining it with the reference beam, thereby to permit the use of small-area holograms as well as small-size optical components.

A further object of the invention is to provide an interferometer for holographic purposes of the type disclosed which permits the use of relatively small and inexpensive optical components and without requiring the high precision optical elements of a conventional interferometer.

SUMMARY OF THE INVENTION

A small-angle interferometer in accordance with the present invention is suitable for obtaining a hologram. It may be used particularly for obtaining double-exposure holograms. The interferometer requires a source of coherent monochromatic light.

First optical means are provided, such as one or two beam splitters disposed in the path of the light from the source for first splitting the light into a reference beam and a subject beam, and for subsequently recombining the reference and subject beams at a small angle. Such a small angle may be defined as an angle of less than 10° and generally less than 5°. A practical range may be between 1° and 3°, or even less.

There are additional optical means such as a mirror for defining a first light path for the reference beam. Further optical means are provided, such as a mirror and lenses, for defining a second light path for the subject beam and for illuminating the subject. This optical means additionally enlarges the cross section of the light from the source to illuminate a subject which is larger in cross section than the cross section of the light of the source. Subsequently the cross section of the subject beam is reduced again substantially to the cross section of the reference beam as the two beams are being recombined. This arrangement makes it possible to illuminate a subject larger than the original light beam. Furthermore, it makes it possible to utilize a small-area hologram with a relatively high light intensity per unit and to use small-size optical components, except for the enlarging and reducing lenses or mirrors.

The novel features that are considered characteristic of this invention are set forth with particularity in the appended claims. The invention itself, however, both as to its organization and method of operation, as well as additional objects and advantages thereof, will best be under-

BRIEF DESCRIPTION OF THE DRAWINGS

FIG. 2 is a schematic view of a modified arrangement utilizing a double Mach-Zehnder interferometer for illuminating a subject so as to obtain two orthogonal views or recordings;

FIG. 4 is a schematic representation of a modification of the interferometer of FIG. 3 utilizing a spherical mirror to further simplify the optical arrangement.

DESCRIPTION OF THE PREFERRED EMBODIMENTS

Figure 1:
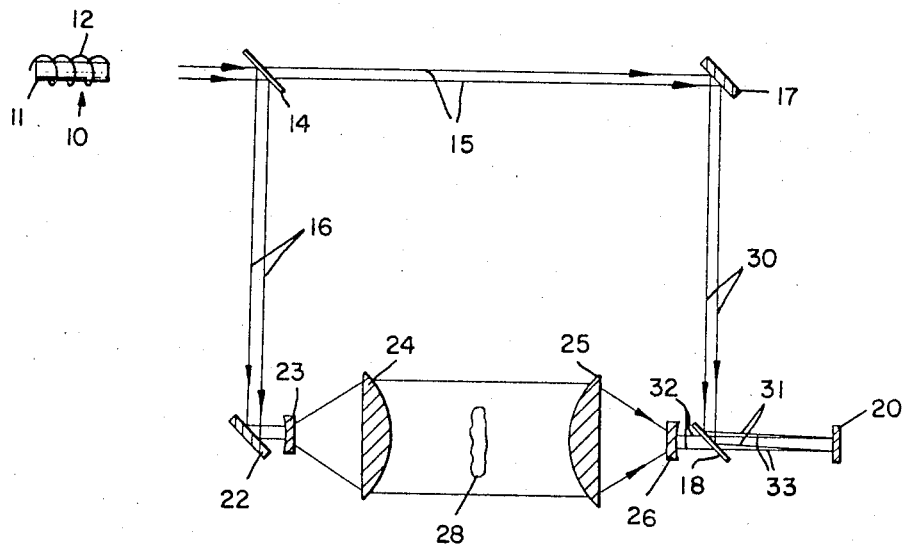
FIG. 1 is a schematic view of an interferometer of the Mach-Zehnder type for taking holograms in accordance with the present invention.

Referring now to the drawings wherein like elements are designated by the same reference characters, and particularly to FIG. 1, there is illustrated a small-angle holographic interferometric arrangement embodying the present invention. As pointed out before, the interferometer of FIG. 1 is of the Mach-Zehnder type, and includes a light source generally indicated at 10. This may, for example, consist of a ruby rod 11 surrounded by a flash tube 12 for generating monochromatic coherent light pulses. However, it will be understood that any other light source which generates monochromatic or quasi-monochromatic coherent light may be used instead, such as a gas laser or even a mercury discharge tube.

The monochromatic light from the light source 10 impinges on a first beam splitter 14 which may, for example, consist of a partially reflecting mirror as shown, or alternatively a suitable prism arrangement. Accordingly the light is split into a reference beam 15 and a subject beam 16. The reference beam 15 is again reflected from a totally reflecting mirror 17 onto a second beam splitter 18 which may be identical to the first beam splitter 14. The light is then recorded on the hologram 20, which may be any suitable light-sensitive material such as a photographic plate or film. Alternatively, a conventional electronic image intensifier tube may also be employed.

As mentioned before, since the interferometer permits to recombine the subject and reference beams at a small angle, it is feasible to utilize a low-resolution medium. Such low-resolution photographic emulsions are usually high-speed films or plates, thus permitting to take a hologram at a high speed.

The subject beam 16 is reflected by a subject mirror 22 and subsequently enlarged in size and thereafter reduced again by a double telescopic arrangement. This includes a first negative lens 23 and a first positive lens 24. The negative lens 23 is shown as a plano-concave lens, while the positive lens 24 may be a plano-convex lens. A second set of lenses 25 and 26 subsequently reduce the size of the subject beam to its original size. Accordingly the lens 25 is again a positive lens and the lens 26 to a negative lens. The subject is shown between the two lenses 24 and 25 at 28. From the negative lens 26 the subject light beam is projected through the beam splitter at 18 and arrives at the hologram 20. The cross section of the reference beam and that of the subject beam when they arrive at the beam splitter 18, that is, when they are recombined, should be substantially equal.

The two beams, namely, the reference beam 15 and the subject beam 16, should recombine at a small angle as defined herein. To this end the mirror 17 and the beam splitter 18 may be adjusted or canted to provide the desired small angle between the two beams. This is clearly shown by the rays 30 and 31 showing the reference beam, and the rays 32 and 33 which designate the subject beam.

While the arrangement illustrated in FIG. 1 as well as those of the other figures could be used for any type of holographic work, they are particularly suitable for double exposure or real-time holographic interferometry.

The advantages of low-angle interferometry have already been pointed out. In other words, this makes it possible to use low-resolution photographic media. The expanded subject beam also has a number of advantages. For example, the initial beam developed by the light source 10 need not have a large cross section, nor does the hologram have to have a large area. This makes it possible to obtain holographic movies on small film such as 16 mm. Additional advantages are that the optical elements such as the two mirrors 17, 22, the two beam splitters 14, 18, and the two negative lenses 23, 26, may be kept small. This of course means that they can be made much cheaper than larger size optical elements. Since both reference and subject beams outside of the test area between the two lenses 24 and 25 are relatively small, they are less affected by air turbulence. Finally, more energy is contained in a unit area of the hologram because the small beam is more concentrated than a large light beam would be.

It should be also noted that double-exposure holography has certain other advantages. For example, phase distortions of the optical components in the system cannot be observed because the interferometer is sensitive essentially only to the phase differences between the two sets of exposures. To put it another way, the same optical path is used for each hologram recording of one set of wavefronts and therefore certain optical distortions will not be observed. Hence it is possible to utilize optical elements which are relatively inexpensive and not of the extremely high optical quality normally required for interferometric work.

Referring now to FIG. 2, there is illustrated an interferometric arrangement consisting of two Mach-Zehnder interferometers. This makes it possible to illuminate and record the subject 28 from two angles, which preferably are at right angles to each other.

Thus the light source schematically shown at 10 illuminates a first beam splitter 14 to split the original light into a reference beam 15 and a subject beam 16. The reference beam then is reflected by the mirror 17 and passes through a second beam splitter 18 onto the hologram 20. This may, for example, be a roll film as shown schematically.

The first subject beam 16 is reflected by the beam splitter 14 onto another beam splitter 35. It is enlarged by two positive lenses 36 and 24 and illuminates the subject 28. The subject beam is subsequently reduced in size again by a pair of positive lenses 25, 37. The reduced beam is then reflected by the beam splitter 18 onto the hologram 20. As pointed out before, the two mirrors 17 and 18 are properly adjusted to create the desired angle between the subject and reference beams when they are recombined.

The advantage of using two positive lenses 36, 24 for enlarging the beam is that there is a focal point between the two lenses. At that focal point a plate 40 may be positioned, having an aperture 41 for eliminating undesired or spurious reflections on the various optical components and mirrors preceding the aperture plate.

The second subject beam is obtained by a beam splitter 39 disposed between beam splitter 14 and mirror 17 in the path of the first reference beam 15. Again the subject beam is enlarged by a pair of positive lenses 42 and 43 projected onto the subject. By the two additional positive lenses 44 and 45 the subject beam is subsequently reduced in size.

The subject beam is projected onto the hologram 46, which may again be a roll film, by a beam splitter 47. The second reference beam is obtained from the first subject beam 16 having passed the beam splitters 14 and 35 and being subsequently reflected by a mirror 48 and through the beam splitter 47 onto the hologram 46. An aperture plate 50 may also be provided between the positive lenses 42 and 43 in the focal point of lens 42 for eliminating spurious reflections on the preceding optical elements.

Figure 3:
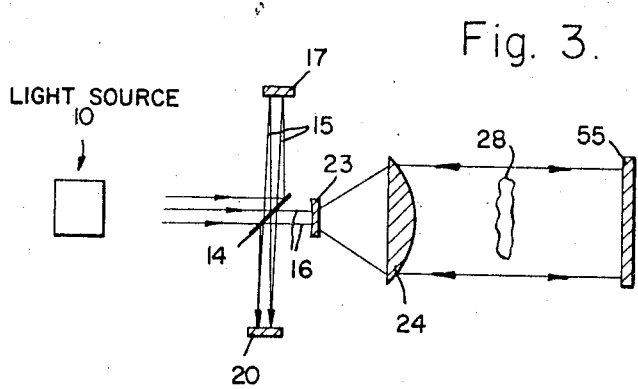
FIG. 3 is a schematic view of an interferometric arrangement of the Twyman-Green type requiring fewer optical components than those of FIGS. 1 and 2.

Another modification of an interferometer in accordance with the present invention is illustrated in FIG. 3. This requires fewer optical components because both the reference and the subject beams are reflected and are recombined with each other through the same beam splitter. The interferometer of FIG. 3 is of the Twyman-Green type.

The input beam developed by the light source 10 is split into a reference beam 15 and a subject beam 16 by a beam splitter 14. The reference beam is reflected by mirror 17 back through the beam splitter 14 onto the hologram 20. As shown in FIG. 3, there is beam shearing, that is, the upper portion of the beam is reflected onto the mirror 17 to form the reference beam 15, while the lower portion of the beam is utilized as the subject beam 16. The purpose of this arrangement is to recombine the two beams in the hologram 20 with the desired small angle therebetween. In lieu of using beam shearing, it is also feasible to provide a mirror which consists of two separately adjustable portions, one of which reflects the outgoing reference beam and the other returns the reference beam. This has been disclosed in my copending application entitled "Multipass Holographic Interferometer," filed concurrently herewith and assigned to the assignee of the present application.

The subject beam 16 is passed through a negative lens 23 and a positive lens 24 to enlarge it before it illuminates the subject 28. Thereafter the subject beam is reflected from a plane mirror 55 back through the lenses 24, 23, the beam splitter 14 onto the hologram 20. Since the subject beam passes the subject twice, only half the number of lenses is required. It should also be noted that the length of the reference beam 15 should generally be made equal to that of the subject beam 16. This may readily be effected by extending the distance between beam splitter 14 and mirror 17 or by providing two mirrors instead of one.

Another variation of the Twyman-Green interferometer is illustrated shown in FIG. 4. The arrangement of the reference beam is the same as that shown in FIG. 3. However, the subject beam is increased in area or cross section by a single negative lens 23 and is subsequently reflected from a spherical mirror 56. This arrangement further reduces the number of optical components required. It should be noted that a spherical mirror such as shown at 56 is relatively inexpensive. Also the spherical mirror 56 is the only large optical component required. Otherwise the interferometer of FIG. 4 operates in the same manner as that of FIG. 3.

There has thus been disclosed a small-angle interferometer particularly suitable for obtaining a hologram of the double-exposure or real-time type. By utilizing a small angle between the recombined subject and reference beams it is possible to use a low-resolution light-sensitive medium. Usually this may be a high-speed photographic emulsion. Alternatively, conventional electronic image intensifier tubes may also be employed. Additionally, means are provided for increasing the cross section of the subject beam for illuminating a subject which may be many times larger in cross section than that of the original light beam. The subject beam is subsequently reduced in size until it matches that of the reference beam when the two are recombined. This makes it possible to take holograms of large subjects without using large light sources or large optical elements except for enlarging the subject beam. When the arrangement is used for a double-exposure hologram, the phase differences of optical imperfections in the optics are eliminated so that it is possible to use less expensive optical components. Nevertheless high quality holograms are obtained which may be taken with extremely short exposure times without requiring high intensity light sources.

What is claimed is:
1. A small-angle interferometer for double-exposure holography with large objects comprising:
  (a) a source of coherent monochromatic light;
  (b) a light-sensitive recording medium disposed in a predetermined plane;
  (c) a beam splitter disposed in the path of said monochromatic light from said source for splitting the light into a reference beam and a subject beam;
  (d) a light reflector disposed in the path of said reference beam for reflecting said reference beam back through said beam splitter onto said recording medium, said reference beam having a predetermined relatively small cross section;
  (e) lens means interposed into the path of said subject beam for first enlarging the cross section of said subject beam so as to be larger than the cross section of said reference beam to permit illuminating a subject larger than the cross section of said reference beam; and
  (f) reflector means disposed in the path of the enlarged subject beam for redirecting the subject beam toward said lens means and back onto said beam splitter, whereupon the subject beam is again reduced in cross section and reflected by said beam splitter toward said recording medium, said lens means, said light reflector and said beam splitter being so arranged that said reference beam and said subject beam form a small non-zero angle at said recording medium, whereby a recording medium of relatively low resolution may be used to improve the light-sensitivity of said interferometer.

2. An interferometer as defined in claim 1 wherein the angle between said reference beam and said subject beam when they are recombined at said recording medium is less than 5°.

3. An interferometer as defined in claim 1 wherein said lens means comprises a telescopic lens system which first enlarges and collimates said subject beam, and said reflector means comprises a flat mirror from which the subject beam is reflected.

4. An interferometer as defined in claim 1 wherein said lens means comprises a negative lens which first diverges said subject beam and said reflector means comprises a spherical mirror, said negative lens and said spherical mirror coacting so as to function afocally.

References Cited

Enloe et al., Bell System Technical Jour., vol. 45, No. 2, February 1966, pp. 335–339.

Brooks et al., IEEE Jour., of Quantum Electronics, vol. QE–2, No. 8, August 1966, pp. 275–279.

Stroke, In Introduction to Coherent Optics and Holography, Academic Press, New York, 1966, pp. 101–103.

DAVID SCHONBERG, Primary Examiner

R. J. STERN, Assistant Examiner

U.S. Cl. X.R.

356—106, 113